Jan. 6, 1970 J. SUNNEN 3,487,886
MEANS FOR INDICATING THE REMAINING CONTENTS OF A CONTAINER
Filed July 20, 1967

INVENTOR:
JOSEPH SUNNEN
BY
Charles B. Haverstock
ATTORNEY.

United States Patent Office 3,487,886
Patented Jan. 6, 1970

3,487,886
MEANS FOR INDICATING THE REMAINING CONTENTS OF A CONTAINER
Joseph Sunnen, 400 S. Warson Road,
Clayton, Mo. 63105
Filed July 20, 1967, Ser. No. 654,859
Int. Cl. G01g 19/52
U.S. Cl. 177—132                          6 Claims

ABSTRACT OF THE DISCLOSURE

An apparatus for indicating the contents of a container such as an aerosol container so that the user can quickly and easily determine when the contents of the container are nearly used up. The present apparatus is for attaching to a removable container overcap such as an overcap for around the valve mechanism on an aerosol container and includes biased lifting means which can be used to support the container and at the same time to indicate the approximate remaining contents of the container.

---

The present invention relates generally to weighing and indicating means and more particularly to means for indicating when the contents of a container such as an aerosol container are nearing exhaustion.

Many products are dispensed from containers such as aerosol containers and for the most part such containers are constructed of opaque materials and it is not possible by visual inspection to determine how full the container is. It is also difficult to guess how much material remains in a closed container merely by lifting it, and it is impractical to weigh the container each time it is desired to know how much product remains, and even if means are available for weighing the container their use is complicated by the fact that the weight of the container must be known and taken into account before the weight of the contents can be determined. Furthermore, the cost and convenience factors incident to the use of weighing means are too objectionable for general use.

Various means have been devised to overcome these and other difficulties and at the same time provide means for indicating the approximate remaining contents of a container such as an aerosol container. The known means include devices for tipping the container when the weight of the container and contents falls below a certain prescribed weight so that the container will not stand upright and other devices which are constructed and operate in various ways. For the most part, the known means have been relatively expensive to construct and attach to the containers, they have required modification of the containers, they have complicated construction of the devices, and the known devices have been inconvenient to use and have made it more difficult to package and store the containers particularly when their weight falls below a predetermined weight. For these and other reasons the known means have enjoyed limited acceptance and as a result many people run out of an aerosol or like product without sufficient advance warning and without having any way of determining this in advance.

The present device overcomes these and other limitations and shortcomings of the prior art by teaching the construction and use of relatively simple inexpensive means for determining the contents remaining in a container such as an aerosol container and for indicating when the contents have been reduced to a level which requires some action such as the purchase of a replacement to avoid running out. The present device is designed to be installed on a removable overcap for an aerosol container and does not require any modification or addition to the container itself. The present device includes spring biased means attached to the overcap, which means can be used to lift and support the container and at the same time to indicate by the position of said lifting means the amount of product remaining in the container.

It is a principal object of the present invention to provide simple inexpensive means for indicating the remaining contents of a container such as an aerosol container and particularly to indicate when the contents are nearing exhaustion.

Another object is to provide means for indicating the approximate remaining contents of a container which means do not require any modification of the container itself.

Another object is to provide means for indicating when to order a replacement for an aerosol container.

Another object is to provide means for determining the remaining contents of an aerosol container which do not alter or detract from the appearance or operating characteristics of the container.

Another object is to provide means on a container cap for use in indicating the contents of the container.

These and other objects and advantages of the present invention will become apparent after considering the following detailed specification which covers a preferred embodiment thereof in conjunction with the accompanying drawings, wherein.

Figure 1:
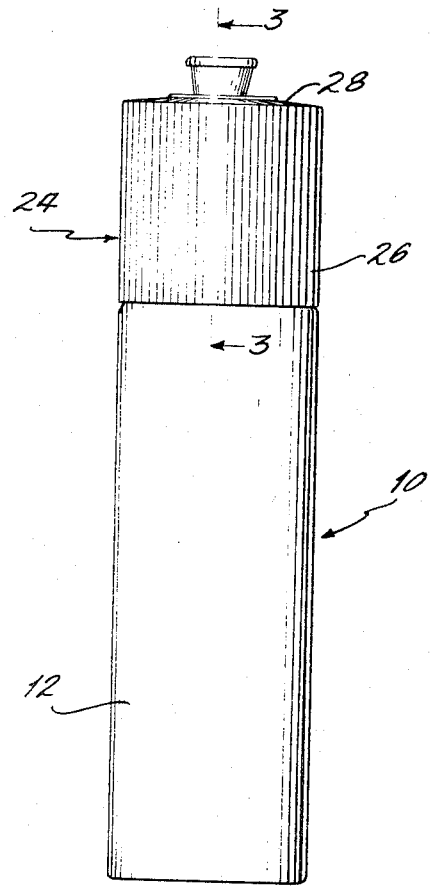
FIG. 1 is a side view of an aerosol container provided with means constructed according to the present invention for use in determining the remaining contents of the container.

Referring to the drawing more particularly by reference numbers, number 10 refers generally to an aerosol container provided with means for determining the contents thereof constructed according to the present invention. The container 10 includes a body portion 12 in which a product to be dispensed including a propellant is positioned. The container includes a valve portion 14 identified generally in FIG. 3. The valve portion 14 may be of conventional construction and is not part of the present invention. The container 12 also includes an upper closure wall 16 on which the valve assembly 14 is mounted, and the closure wall 16 is crimped or otherwise fastened to the upper reduced diameter open end of the body 12 at 18. The crimped portion of the closure wall 16 is indicated at 20 and may include suitable sealing means to prevent leakage. The outer edge of the crimped portion 20 forms an annular shoulder 22 which extends around the upper end of the container. The shoulder 22 provides means for attaching a cap portion such as overcap 24.

Figure 3:
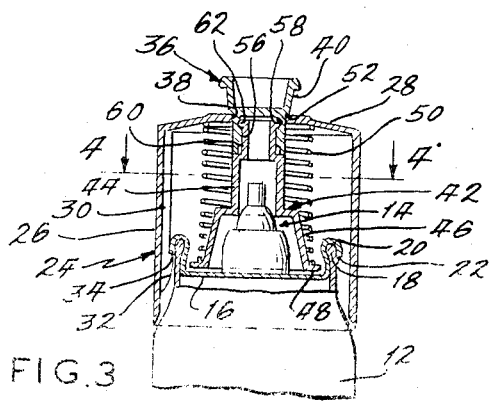
FIG. 3 is a cross-sectional view of the subject means taken along lines 3—3 of FIG. 1; and, FIG. 4 is a cross-sectional view taken along lines 4—4 of FIG. 3.
Figure 4:
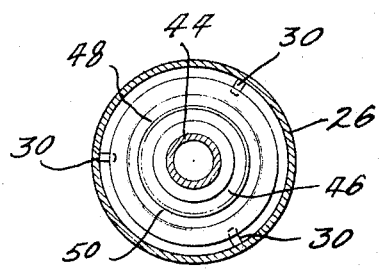

The overcap 24 is shown as including a cylindrical side wall 26 and an end wall 28. The cap 24 is attached to the body 12 by means of a plurality of spaced rib members 30 which are formed on the inner surface of the side wall 26 as shown in FIGS. 3 and 4. The ribs 30 of which there are three shown extend axially along the inner surface of the wall 26 and each rib has an enlarged portion 32 on which is formed a shoulder 34. The shoulders 34 on the ribs 30 cooperate with the annular shoulder 22 on the crimped portion 20 of the wall 16 to provide means for attaching the overcap 24 to the container. The overcap is preferably formed of a plastic material that is somewhat resilient so that it can be removed and reinstalled relatively easily. When the cap is removed from the aerosol container 10 the valve assembly 14 is exposed and can be operated in the usual manner to expel the contents of the container. When the overcap is installed on the container, however, the valve assembly 14 is enclosed thereby and hidden from view in the manner illustrated in FIG. 3.

The present invention resides in means attached to or mounted on the overcap which can be used to measure or indicate the approximate remaining contents of the container. This enables the user to know in particular when the contents of the container are nearly used up so that he has time to buy another container before he completely runs out. The improvement includes mounting a plunger member 36 preferably also formed of inexpensive plastic material in an opening 38 in the overcap. The plunger 36 includes a handle portion 40 positioned on the outside and above the overcap 24 which portion is too large to pass through the opening 38. The plunger also includes an inner portion 42 which is positioned inside the overcap and is fixedly connected to the handle portion 40 by cylindrical connection portion 44 which is smaller in diameter than the opening 38 through which it extends. The inner member 42 includes a flanged portion 46 which is shaped to fit over and around the valve assembly 14 when the overcap is positioned on the container without engagement therewith. The flanged portion 46 has an annular outwardly extending flange 48 formed on the lower end thereof which is smaller in diameter than the inner diameter of the crimped portion 20 so that it can extend into the space defined by the portion 20 without interference therewith.

Figure 2:
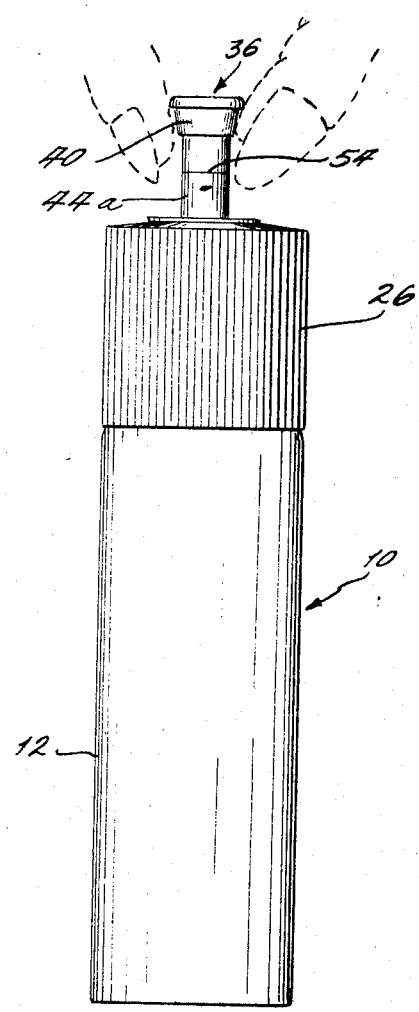
FIG. 2 is a view similar to FIG. 1 showing the container being supported in elevated position by the said means for indicating the remaining contents thereof.

A spring 50 is positioned around the cylindrical portion 44 of the member 36 inside of the overcap 24 and extends between the flange 48 and the inner surface of the cap end wall 28. The spring 50 is constructed to have predetermined compression characteristics and to normally maintain the plunger member 36 in the position shown in FIG. 3 with shoulder 52 on the handle portion 40 engaging the outer surface of the cap wall 28 adjacent to the opening 38. This is the inoperative position of the device. When the subject device is used for indicating the remaining contents of the container, however, it is lifted and supported by the handle portion 40 with the weight of the container and contents suspended and supported by the spring 50. If the container is relatively full its weight will substantially compress the spring and all or most of the cylindrical portion 44 of the plunger member 36 will extend from the opening 38 above the cap wall 28 as shown in FIG. 2 and this will indicate that the container has substantial remaining contents. The amount of the cylindrical portion 44 that extends above the cap is therefore a measure of the remaining contents of the container. If, on the other hand, only a relatively small amount of the portion 44 extends out from the cap wall 28 it indicates that the container is nearly empty and a new container should be purchased to prevent running out.

Referring again to FIG. 2, the plunger member 36 is shown formed of two different colored connected portions which meet at an abutment 54. In this case, the lower part of the plunger 44a below the abutment is formed of material of one color and the upper part above the abutment 54 is formed of a different colored material. The abutment 54 in conjunction with the upper surface of the cap 24 provides a convenient way to establish an arbitrary boundary condition between a product weight condition that indicates a substantial remaining contents and a weight that indicates it is time to obtain a new supply of the product to prevent running out. If the container is lifted by the handle portion 40 and no part of the lower cylindrical portion 44a below the abutment 54 is visible above the cap end wall 28 this means that the container is about empty. On the other hand, if a substantial amount of the cylindrical rod portion 44 including a substantial portion of the lower rod portion 44a is visible when the container is lifted by the plunger member 36 or if the flanged portion 46 engages the end wall 28 this means that the container has a substantial amount of remaining contents at that particular time.

FIG. 3 shows one of many possible ways of connecting the plunger portions 40 and 42 together. In the construction as shown the member 40 has a socket 56 with an annular groove 58 formed therein, and the member 42 is constructed having a tubular extension 60 with an annular rib 62 which cooperatively mates with the groove 58 when the members are forced together. Other ways of connecting the members 40 and 42 can also be used including adhesively connecting them, threadedly connecting them and so on. One of the advantages of using the particular form of connection means disclosed, however, is that they are relatively quickly and easily assembled without requiring special tools. The position of the abutment 54 and the construction and manner of connecting the members 40 and 42 can be varied substantially without departing from the spirit and scope of the invention, and the members 40 and 42 can be constructed of the same color material and a line can be placed on the outer surface at the desired place to indicate the remaining contents. A graduated scale can also be used. It is also contemplated to use the same or similar weighing means on other types of containers besides aerosol containers, for example, on any container where the contents cannot be inspected visibly such as on tin cans, cosmetic containers, and many others.

Thus there has been shown and described novel means for indicating the remaining contents of a container such as an aerosol container which fulfills all of the objects and advantages sought therefor. Many changes, modifications, alterations, and other uses and applications of the subject device will, however, become apparent to those skilled in the art after considering this specification and the accompanying drawing. All such changes, modifications, alterations, and other uses and applications which do not depart from the spirit and scope of the invention are deemed covered by the invention.

What is claimed is:

1. Means for indicating the approximate remaining contents of a container comprising a container, a cap for said container, means for attaching the cap to the container, means mounted on said cap to indicate the approximate remaining contents of the container, said last named means including said cap having an opening and a plunger member mounted extending through said opening, said plunger member having first and second portions positioned respectively on the outside and inside of the cap on opposite sides of the cap opening, and a rod portion connected between said first and second portions and movable through the cap opening, and yieldable means positioned on the rod portion of the plunger member abutting the cap adjacent to the cap opening at one end thereof and abutting said second portion of the plunger member at the opposite end thereof to urge the plunger member to a position in which the first portion abuts the outer surface of the cap.

2. The means defined in claim 1 wherein said means for attaching the cap to said container include means on the cap engageable with cooperating means on the container for maintaining the cap thereon, said means being releasable to permit removal of the cap from the container.

3. The means defined in claim 1 wherein said container is an aerosol container and said cap includes a member having a tubular wall portion and an end wall portion closing one end of the tubular portion, the cap opening being in said cap end wall portion.

4. In an aerosol container having a body portion for containing a product to be expelled and a propellant, valve means located on one end of the body portion and a removable cap for over the valve portion the improvement comprising means installed on the removable cap by which the weight of the remaining contents of the container can be determined, said means including a member movably mounted on the cap, said member having a handle portion, spring means biasing said member into a position on the cap that is toward the container body portion so that when the handle portion is used to lift the container the weight of the container and contents will operate against the spring means, the position of the movable member relative to the cap when the container is being supported by the handle portion being an indication of the approximate contents of the container.

5. In the aerosol container defined in claim 4 said cap includes a member having an opening therethrough and said member movable relative to said cap includes a member having a first portion that extends through the cap opening, the handle portion being attached to one end of said first portion, and a second portion attached to the opposite end of said first member from the handle portion, said second portion including flanged means that are too large to pass through the cap opening, the spring means including a coil compression spring positioned around the first portion of said movable member and abutting the flange portion thereof at one end and the removable cap at the opposite end.

6. Means for indicating the remaining contents of a container comprising a container, closure means for the container, yieldable means mounted on the closure means including a member movable relative thereto, said yieldable means normally biasing said member into a retracted position on said closure means, said movable member having means thereon for lifting and supporting the container so that the weight of the container and contents are borne by the yieldable means, the position of the movable member on the closure means when the container is being lifted and supported thereby indicating the approximate remaining contents of the container, said container being an aerosol container having valve means at the upper end thereof, the closure means including an overcap attachable to the container, said overcap having an opening therethrough and said movable member including a rod-like portion that extends through said overcap opening having a handle portion attached to one end thereof outside of the overcap and a flanged portion attached to the opposite end thereof on the inside of the overcap, said flanged portion being shaped to accommodate the valve means without interference therewith, said yieldable means including a compression spring positioned around the rod-like portion of the movable member and extending between the flanged end portion thereof and the inner surface of the overcap.

References Cited

UNITED STATES PATENTS

| 452,278 | 5/1891 | McIlvaine | 177—233 |
| 1,502,698 | 7/1924 | Tooley | 222—183 X |
| 1,879,228 | 9/1932 | Heigis. | |
| 2,707,930 | 5/1955 | Miles | 116—114 |
| 3,254,803 | 6/1966 | Meshberg | 222—183 X |
| 3,091,302 | 5/1963 | Wolven | 177—149 |

FOREIGN PATENTS 1,040,077  5/1953  France.

LOUIS R. PRINCE, Primary Examiner

D. M. YASICH, Assistant Examiner

U.S. Cl. X.R.

116—114